Figure 1:
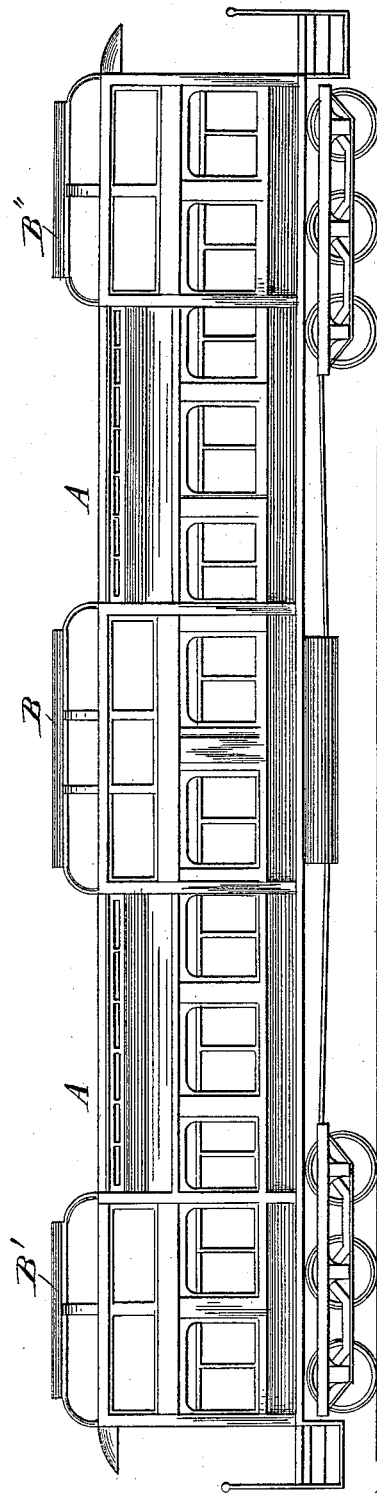

(No Model.)  T. J. McBRIDE.  6 Sheets—Sheet 2.
OBSERVATORY CAR.

No. 447,785.  Patented Mar. 10, 1891.

Witnesses.  Inventor.
A. M. Opsahl.  Thomas J. McBride
Frank D. Merchant.  By his Attorney.
Jas. F. Williamson (No Model.) 6 Sheets—Sheet 3.

T. J. McBRIDE.
OBSERVATORY CAR.

No. 447,785. Patented Mar. 10, 1891.

Witnesses
A. H. Opsahl.
Frank D. Merchant.

Inventor
Thomas J. McBride
By his Attorney.
Jas. F. Williamson (No Model.)  
T. J. McBRIDE.  
OBSERVATORY CAR.  
6 Sheets—Sheet 4.

No. 447,785. Patented Mar. 10, 1891.

Witnesses.  
A. H. Opsahl.  
Frank D. Merchant.

Inventor.  
Thomas J. McBride  
By his Attorney.  
Jas. F. Williamson

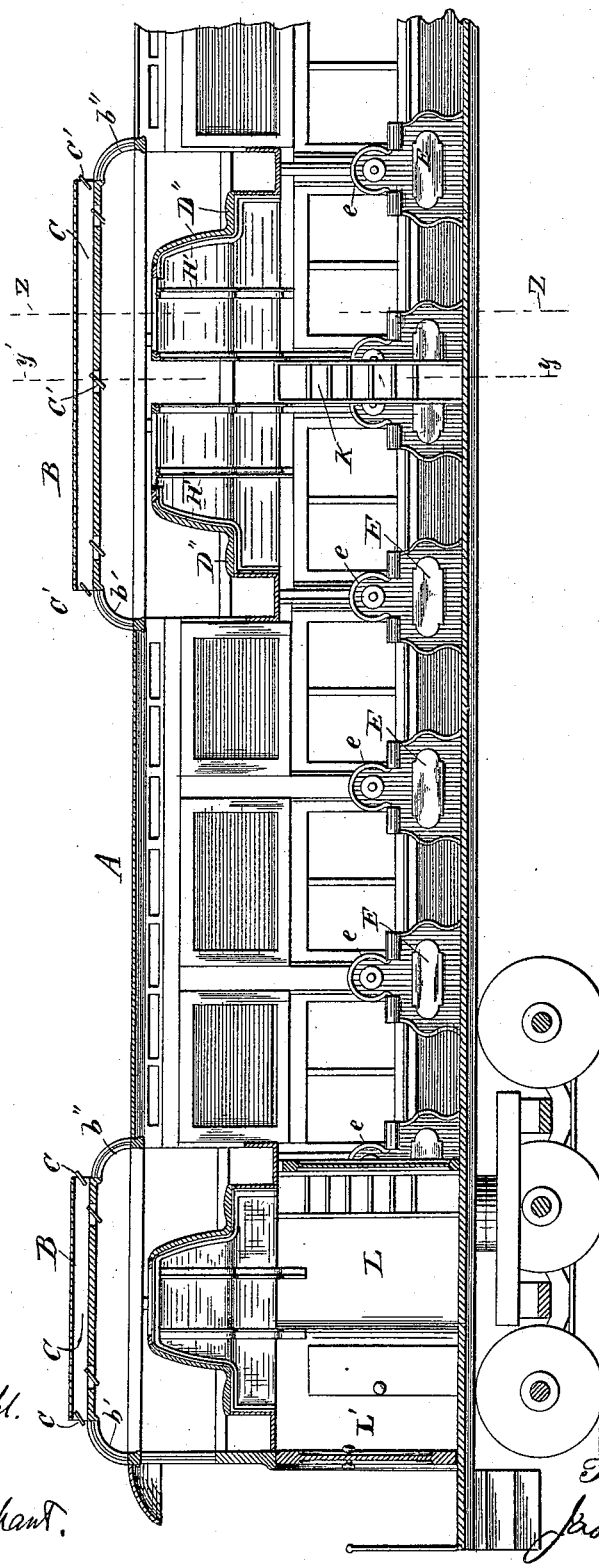

(No Model.) 6 Sheets—Sheet 6.

T. J. McBRIDE.
OBSERVATORY CAR.

No. 447,785. Patented Mar. 10, 1891.

Witnesses.
A. H. Opsahl.
Frank D. Merchant.

Inventor.
Thomas J. McBride
By his Attorney.
Jas. F. Williamson

UNITED STATES PATENT OFFICE.

THOMAS JAMES McBRIDE, OF WINNIPEG, CANADA.

OBSERVATORY-CAR.

SPECIFICATION forming part of Letters Patent No. 447,785, dated March 10, 1891.

Application filed August 30, 1890. Serial No. 363,549. (No model.)

*To all whom it may concern:*

Be it known that I, THOMAS JAMES MCBRIDE, a citizen of the Dominion of Canada, residing at Winnipeg, Province of Manitoba, Canada, have invented certain new and useful Improvements in Observatory - Cars; and I do hereby declare the following to be a full, clear, and exact description of the invention, such as will enable others skilled in the art to which it appertains to make and use the same.

My invention relates to railway passenger-cars, and has for its object to increase the comforts and enjoyments of travel. To this end I construct the coach with upwardly-extended observatory-sections continuous with the interior of the body of the car, having transparent walls, and provide the same with elevated seats. A comparatively unobstructed vision is thus afforded to occupants of the observatory-section, enabling them to enjoy the scenery in all directions. In view of their elevated positions, they can also see a large part of the interior of the car. By the proper arrangement of the air outlets and inlets improved ventilation may be afforded, owing to its greater elevation, thus affording unimpeded access to the air, thus increasing the comfort of the occupants. As is well known, the principal relief to the tediousness and wearing effects of railway travel is the interest excited by the scenery along the line. In the cars as hitherto constructed the outlook without change of position has been limited either to one side only or to a backward view from the rear platform.

With my preferred form of the observatory the occupants of the choice seats can see in every direction as freely as if on top of the car. It is thought that the increased enjoyment thus placed within the reach of the passenger would cause the observatory seats to command an extra fare. The observatory can be so placed as to make practically no interference with the customary usage of the floor-space of the car, or even so as to utilize spaces now wasted—such, for example, as that above the required space for the toilet-rooms.

I have shown the invention as applied to an ordinary sleeping-car, inasmuch as that form of car most readily lends itself to the purpose; but of course other forms of passenger-cars could also be used.

In the accompanying drawings I have shown the broad feature of the invention, with three modifications in the arrangement of the elevated seats.

Figure 2:
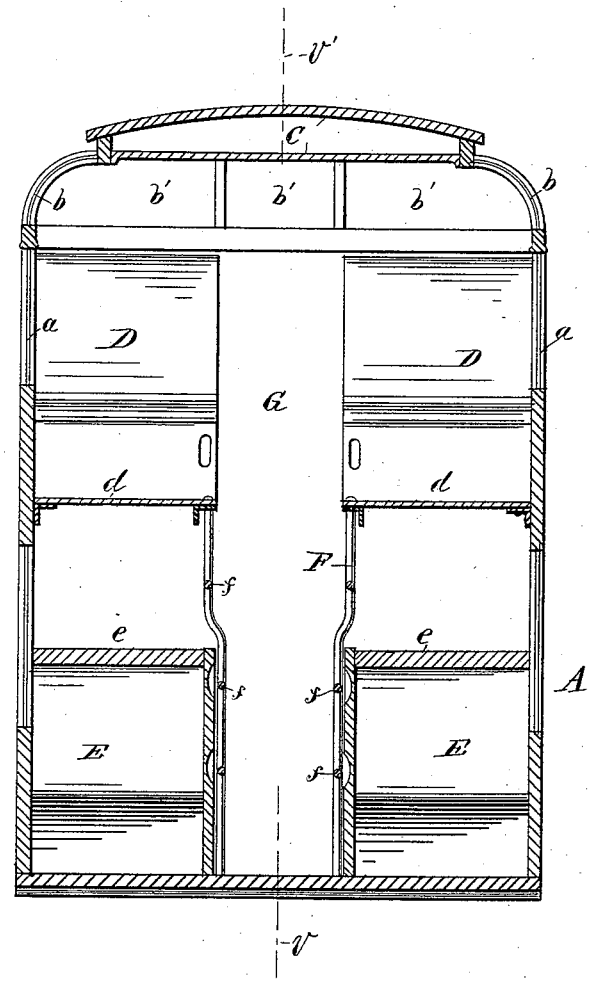
Figure 3:
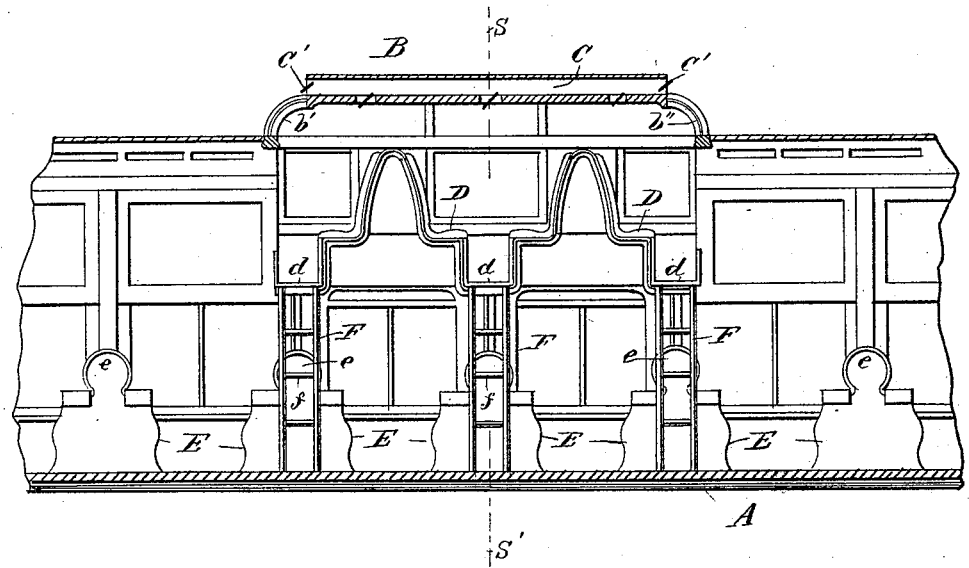
Figure 5:
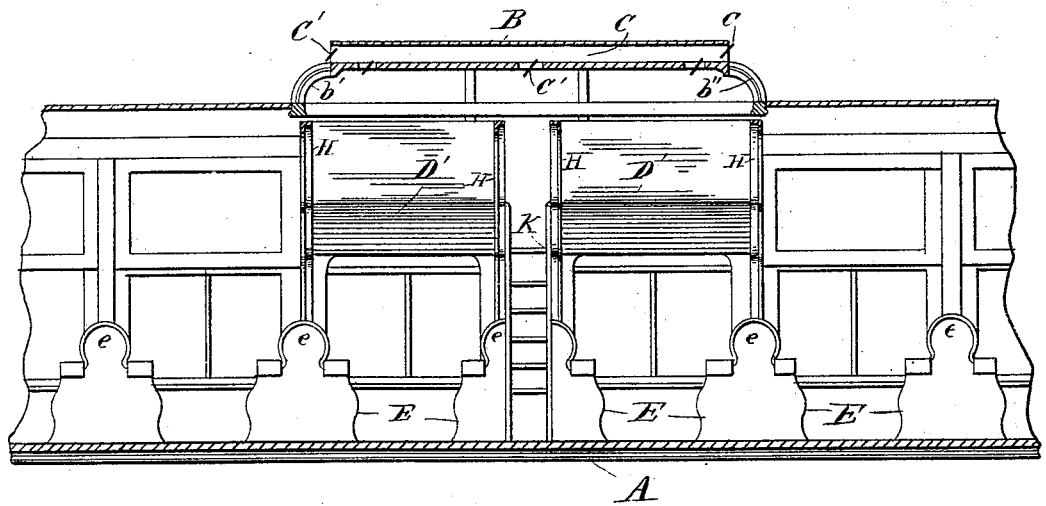
Figure 4:
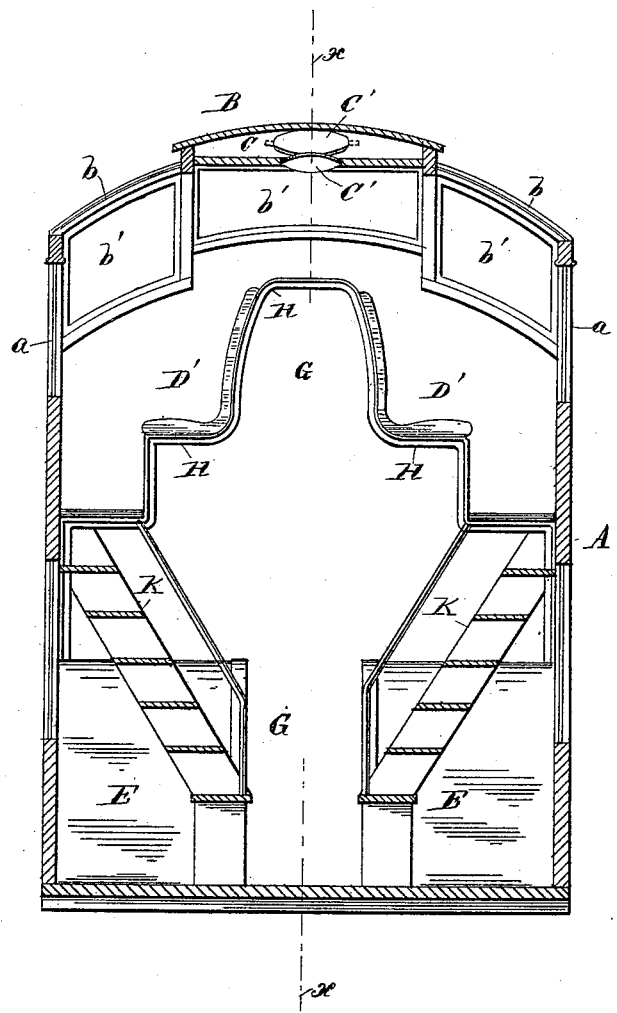
Figure 7:
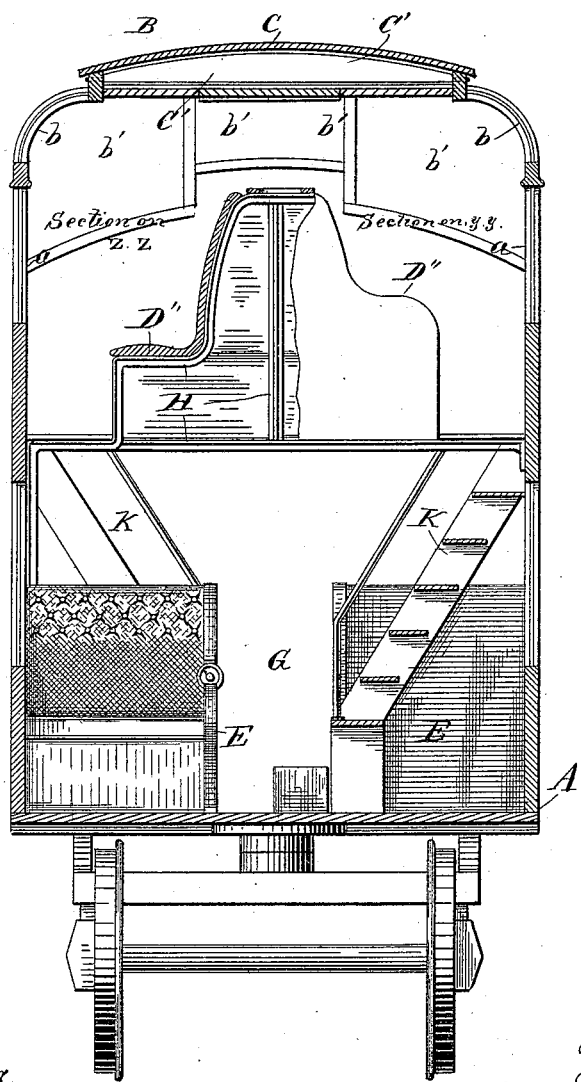

In the drawings, like letters referring to like parts throughout, Figure 1 is a side elevation of the car with observatory-sections. Fig. 2 is a cross-section of the central observatory on the line S S of Fig. 3. Fig. 3 is a longitudinal central section of the same on the line V V' of Fig. 2. Figs. 4 and 5 are respectively corresponding views of a modified arrangement of seats, Fig. 5 being a section of the line X X' of Fig. 4. Fig. 6 is a longitudinal central section of the car, showing a further modification in the arrangement and support of the seats; and Fig. 7 is a cross-sectional view of the central observatory shown in Fig. 6, the right half of the line Z Z' of the said figure.

A is a body of the car.

B' and B' are the observatory-sections.

$a$ $a$ are the transparent sections in the roof, and $b'$ $b''$ are respectively the front and rear transparent walls to the part of the observatory extended above the main roof.

C is the double roof to the observatory, with air-spaces between its two parts. C' are the transoms in the same.

If so desired, a curtain (not shown) may be used on the inside of the transparent walls, especially for the roof-sections $b$ $b$.

D (see Figs. 2 and 3) are the elevated seats, and E are the lower or floor tier of seats. Both sets are arranged in faced pairs. The upper set are parallel with the lower set, but alternately arranged with reference thereto, the foot-rests $d$ of the upper set being over the backs of the lower set. The upper seats are partly supported from the sides of the car and partly from standards or fork-like columns F, extending from the lower seat-backs or from the floor at the outer or aisle ends of the backs of the lower seats.

G is the aisle-space.

In the modification shown in Figs. 4 and 5, which is my preferred construction, the elevated seats D' are arranged longitudinally of the car over the lower seats with their backs to the aisle and their faces to the outside of the car, and may be supported entirely from the top and sides of the car, or in part from the backs of some of the lower seats, or by bridge-braces H, extending to or tying the seat-backs together on the opposite sides of the aisle.

In the modification illustrated in Figs. 6 and 7 the elevated seats D″ are arranged in a rectangle, the rear and end sides extending across the aisle-space and the side seats facing the exterior of the car, and the whole is supported in part from a sort of skeleton deck or framing H′, attached to the sides of and extending across the car.

In the above modifications shown in Figs. 4, 5, 6, and 7, in order to give access to the upper seats, a stairway K is used, located between the backs of adjacent lower seats, which are spaced apart sufficiently for the purpose.

The last-described modification is most desirable, as it does not obstruct the light and affords sufficient clearance in the aisle without undue elevation of the observatory, the side seats occupying the space ordinarily used for the upper berths. It should be noted that in Fig. 6 one of the entire observatories is shown as located over the toilet-rooms L L′. It will be understood that the seats may be arranged therein in any of the three ways described.

The usage and advantages of the invention have already been described.

What I claim, and desire to secure by Letters Patent, is as follows:

1. A passenger-car constructed with one or more observatory-sections extended above the level of the other portions of the car, the said observatory-sections being provided with transparent walls and seats for passengers, the interior of the observatory-section being continuous and undivided from the body of the car, whereby the observatory does not obstruct or interfere with the customary usage of the lower or floor space of the car and affords to the occupants thereof a view of the interior of the car, substantially as set forth.

2. A passenger-car constructed with one or more observatory-sections extended above the body of the car and having its interior continuous therewith provided with transparent walls, and having elevated seats in the upper or observatory portion, and the lower tier of seats on the car-floor, with a common or central or aisle space extending from the floor to the top of the car.

3. The combination, with the car-body having a lower or floor tier of seats crosswise of the car, of an upwardly-extended observatory-section continuous with the body of the car, having transparent walls, and elevated seats in said observatory-section parallel with said lower seats, having their foot-rests in line with the backs of the lower seats.

4. In the sleeping-car or other passenger-coach having its seats arranged in pairs face to face, the combination, with the car-body, of the upwardly-extended observatory-sections having transparent walls and elevated face-to-face seats located therein parallel with the lower seats, alternating therewith, and having their foot-rests over the backs of the lower seats, whereby comparatively little obstruction is interposed in the central upper space over the lower pair of seats.

5. In the sleeping-car or other passenger-coach having its seats arranged in pairs face to face, the combination, with the car-body, of the upwardly-extended observatory-sections having transparent walls, the elevated pairs of faced seats located in the observatory portion parallel and alternating with the lower seats and having the foot-rests in line with the backs thereof, and supports extending from the backs of the lower seats to the foot-rest portion of the upper seats, provided with steps on their aisle-face for affording access to the upper seats.

6. The combination, with the car-body, of the observatory-sections extended above the level thereof and having their interiors continuous therewith, of a double central roof and the observatory-sections having its two parts spaced apart and provided with air-inlets, whereby the top of the observatory is kept comparatively cool.

7. The combination, with the car-body, of the upwardly-extended observatory-sections continuous therewith, provided with double roofs spaced apart, transoms to the lower wall thereof, leading to the interior of the observatory and the car-body, substantially as described.

8. The combination, with the car-body, of the upwardly-extended observatory-section having its interior continuous therewith, provided with transparent side and end walls and transparent sections in its roof, directly over the elevated seats, substantially as described.

9. The combination, with the car-body having an observatory extended above the level thereof, of a stair located between the backs of two lower seats and affording access to the upper seats at a point adjoining the side wall of the car or in the space usually occupied by the upper berths.

10. The combination, with the car-body having an observatory extended above the level thereof, of a seat or seats facing the walls of the car and having the foot-space adjoining the wall.

In testimony whereof I affix my signature in presence of two witnesses.

THOMAS JAMES McBRIDE.

Witnesses:
ERNEST W. ALLEN,
R. H. AGUR.